United States Patent
Kamikado

Patent Number: 5,924,777
Date of Patent: Jul. 20, 1999

[54] ANTILOCK BRAKE SYSTEM

[75] Inventor: Masaru Kamikado, Kariya, Japan

[73] Assignee: Aisin Seiki Kabushiki Kaisha, Aichi-ken, Japan

[21] Appl. No.: 08/640,823

[22] PCT Filed: Sep. 27, 1995

[86] PCT No.: PCT/JP95/01960

§ 371 Date: May 8, 1996

§ 102(e) Date: May 8, 1996

[87] PCT Pub. No.: WO96/09947

PCT Pub. Date: Apr. 4, 1996

[30] Foreign Application Priority Data

Sep. 28, 1994 [JP] Japan ................................. 6-233862
Mar. 31, 1995 [JP] Japan ................................. 7-075849
Sep. 21, 1995 [JP] Japan ................................. 7-242683

[51] Int. Cl.$^6$ .............................................. B60T 8/32
[52] U.S. Cl. ........................................ 303/150; 303/116.2
[58] Field of Search ........................... 303/113.1, 113.2, 303/113.5, 150, 116.1, 116.2, 119.1, 900

[56] References Cited

U.S. PATENT DOCUMENTS

| | | | |
|---|---|---|---|
| 5,417,483 | 5/1995 | Sigl | 303/116.1 |
| 5,531,514 | 7/1996 | Hishii et al. | 303/116.1 |
| 5,538,335 | 7/1996 | Saito et al. | 303/113.1 |
| 5,584,540 | 12/1996 | Takeuchi et al. | 303/900 |
| 5,620,238 | 4/1997 | Takeuchi | 303/113.2 |
| 5,649,747 | 7/1997 | Naito et al. | 303/116.1 |
| 5,683,149 | 11/1997 | Aizawa et al. | 303/10 |
| 5,711,582 | 1/1998 | Koike | 303/11 |
| 5,722,744 | 3/1998 | Kupfer et al. | 303/189 |
| 5,727,852 | 3/1998 | Pueschel et al. | 303/113.4 |

FOREIGN PATENT DOCUMENTS 62-134361 6/1987 Japan.
3-208758 9/1991 Japan.
4-331654 11/1992 Japan.

Primary Examiner—Chris Schwartz
Attorney, Agent, or Firm—Burns, Doane, Swecker & Mathis, L.L.P.

[57] ABSTRACT

In an antilock brake system in which brake fluid that flows out to a low back-pressure reservoir at the time of a reduction in brake pressure is fed into a wheel brake by a motor driving pump without passing through a control valve to thereby gradually increase the pressure, it is possible to increase the brake fluid pressure to a pressure sufficient to prevent wheel lock even if the road surface has a low coefficient of friction. If, at the time of the reduction in brake fluid pressure, a device for estimating the coefficient of friction of the road surface determines that the road surface coefficient of friction is low, the motor is deactuated (or operated at low velocity) so that the pump will not feed brake fluid to the wheel brake (or so that the amount of brake fluid fed from the pump to the wheel brake is reduced).

3 Claims, 7 Drawing Sheets

ANTILOCK BRAKE SYSTEM

This invention relates to an antilock brake system which prevents the locking of wheels by controlling the braking force applied to the wheels when a vehicle is braked. More particularly, the invention relates to an antilock brake system having at least one wheel brake, a master cylinder for supplying brake fluid pressure to this wheel brake, a control valve operated in a normal condition in which the wheel brake is communicated with the master cylinder and cut off from a low back-pressure reservoir, a pressure-reducing condition in which the wheel brake is cut off from the master cylinder and communicated with the low back-pressure reservoir, a slow pressure-increasing condition in which the wheel brake is cut off from the master cylinder and cut off from the low back-pressure reservoir as well, a pump for pumping the brake fluid within the low back-pressure reservoir to the wheel brake without passing it through the control valve, and a motor for driving the pump.

BACKGROUND ART

An antilock brake system of this kind is well known and is described, by way of example, in Japanese Patent Application Laid-Open No. 62-134361. It is described in this laid-open publication that a motor is rotated continuously from the start of a slow increase in pressure the first time the increase is performed to the end of antiskid control in order to avoid a lag in pressure increase when fluid brake fluid pressure is slowly increased during antilock control, and to make it possible to drive two pumps by the single motor.

In a case where the motor is thus rotated continuously from the start of the first slow increase in pressure to the end of antiskid control, the brake fluid that has been fed under pressure from the pump to the wheel brake flows out to the low back-pressure reservoir through the control valve operating in the pressure-reducing condition during a decrease in pressure from the second time onward. As a result, brake fluid pressure (fluid pressure within the wheel brake) during the pressure decrease cannot be reduced to the fluid pressure of the low back-pressure reservoir. In other words, the amount of brake fluid that flows out from the wheel brake to the low back-pressure reservoir via the control valve varies in dependence upon the pressure differential between the brake fluid pressure and the fluid pressure in the low back-pressure reservoir. The amount of brake fluid outflow decreases as the brake fluid pressure declines. When the amount of brake fluid that flows from the wheel brake to the low back-pressure reservoir via the control valve has decreased to an amount of flow the same as that of the brake fluid fed from the pump, the brake fluid pressure stops falling.

The amount of flow of brake fluid fed under pressure from the pump to the wheel brake generally is set so as to obtain an appropriate slow pressure-increase gradient for a road surface on which antilock control is performed with a high degree of frequency (namely a road surface for which the coefficient of friction is higher than that of an iced road surface).

In accordance with the prior art, therefore, when antilock control is performed with the vehicle running on an iced road surface, there is the fear that locking of the wheels will be unavoidable because it will not be possible to reduce the brake fluid pressure sufficiently. The object of the invention of this application is to arrange it so that an appropriate slow pressure-increase gradient can be obtained for a road surface having a high coefficient of friction, and so that brake fluid pressure can be reduced sufficiently for a road surface having a low coefficient of friction, such as the coefficient of friction of an iced road surface, i.e., so that the brake fluid pressure can be reduced to the fluid pressure of the reservoir.

DISCLOSURE OF THE INVENTION

An antilock brake system according to the invention of this application in line with the above-mentioned object has, as shown in FIG. 1, at least one wheel brake, a master cylinder for supplying brake fluid pressure to this wheel brake, a control valve operated in a normal condition in which the wheel brake is communicated with the master cylinder and cut off from a low back-pressure reservoir, a pressure-reducing condition in which the wheel brake is cut off from the master cylinder and communicated with the low back-pressure reservoir, a slow pressure-increasing condition in which the wheel brake is cut off from the master cylinder and cut off also from the low back-pressure reservoir, a pump for pumping the brake fluid within the low back-pressure reservoir to the wheel brake without passing it through the control valve, and a motor for driving the pump, the system comprising wheel velocity detecting means for detecting rotational velocity of a wheel braked by the wheel brake, control valve operating means for operating the control valve in any one of the three above-mentioned states based upon an output from the wheel velocity detecting means, road-surface coefficient of friction estimating means for estimating a coefficient of friction of the road surface on which the wheel is traveling, and motor operating means for operating the motor based upon at least results of estimation from the road-surface coefficient of friction estimating means and a control-valve operating output from the control valve operating means.

In the antilock brake system having the construction described above, rotation of the motor can be started and stopped (or the motor can be rotated at high speed and low speed) in dependence upon the estimated value of the coefficient of friction of the travel road surface and the operating state of the valve. For example, it can be set so that when the road-surface coefficient of friction estimating means estimates that the coefficient of friction is not low, the motor is rotated continuously (or rotated at high speed) from operation of the control valve in a pressure-reducing condition the first time (i.e., from start of antilock control) to the end of antilock control. Further, it can be set so that when the road-surface coefficient of friction estimating means estimates that the coefficient of friction is low, the motor is not rotated (or is rotated at low speed) at such time that the control valve is operated in the pressure-reducing condition and is rotated at such time that the control valve is operated in the slow pressure-increasing condition.

In a case where such a setting is made, brake fluid is supplied from the master cylinder to the wheel brake through the control valve when the master cylinder is operated, as a result of which the brake fluid pressure rises and braking force is applied to the wheel. Next, when antilock control begins and the control valve is operated in the pressure-reducing condition, the brake fluid within the wheel brake flows out to the low back-pressure reservoir and the brake fluid pressure decreases.

If the coefficient of friction of the travel road surface is not a low coefficient of friction, the motor is rotated continuously (or rotated at high speed) from operation of the control valve in a pressure-reducing condition the first time to the end of antilock control. Therefore, when the control valve is operated in the slow pressure-increasing condition, a slow increase in the brake fluid pressure starts promptly even when the valve is operated in the slow pressure-increasing condition the first time. Furthermore, the brake fluid fed under pressure from the low back-pressure reservoir to the wheel brake by the pump when the control valve is operating in the pressure-reducing condition flows out to the low back-pressure reservoir again through the valve. The amount of flow of brake fluid fed under pressure from the low back-pressure reservoir to the wheel brake by the pump is set so as not to impede the reduction in brake fluid pressure and so as to obtain a slow pressure-increase gradient conforming to a road surface that does not have a low coefficient of friction. The amount of flow of brake fluid is set to be considerably less than the amount of brake fluid that flows out of the wheel brake to the low back-pressure reservoir through the control valve.

If the coefficient of friction of the travel road surface is a low coefficient of friction, the motor is not rotated (or is rotated at low speed) when the control valve is operated in the pressure-reducing condition, as a result of which the pump does not feed the brake fluid under pressure from the low back-pressure reservoir to the wheel brake (or reduces the amount of flow of brake fluid from the low back-pressure reservoir to the wheel brake). Therefore, the brake fluid pressure is capable of being reduced to the fluid pressure of the low back-pressure reservoir owing to the fact that the control valve operates in the pressure-reducing condition, regardless of the set value of the amount of pump discharge when the motor is rotating. Thereafter, the motor is rotated (or rotated at high speed) in accordance with the fact that the control valve is operated in the slow pressure-increasing condition, and the brake fluid pressure gradually increases owing to the fact that the pump feeds the brake fluid under pressure from the low back-pressure reservoir to the wheel brake.

BEST MODE FOR CARRYING OUT THE INVENTION

An embodiment of an antilock brake system according to this application will now be described with reference to FIGS. 2–8.

Figure 1:
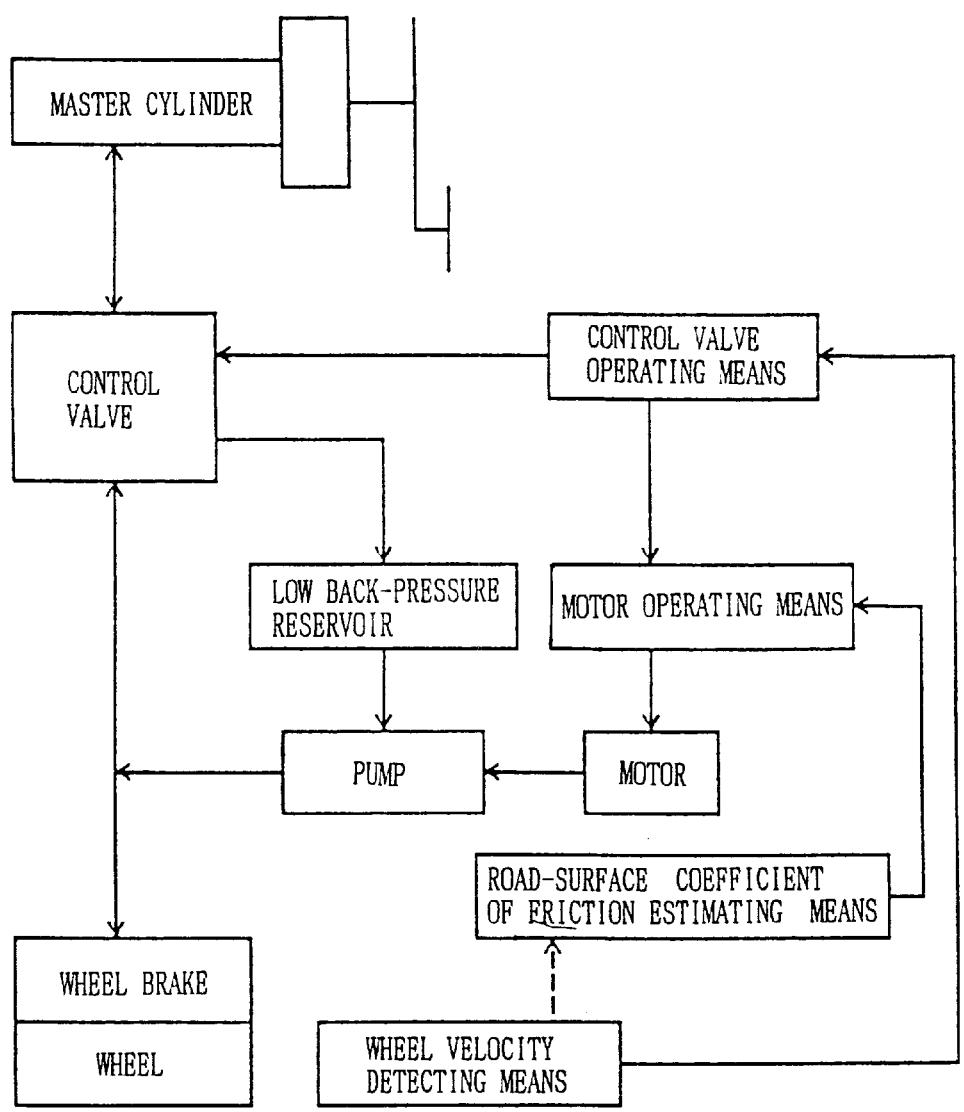
FIG. 1 is a block diagram showing an overview of an antilock brake system according to the invention of this application.
Figure 2:
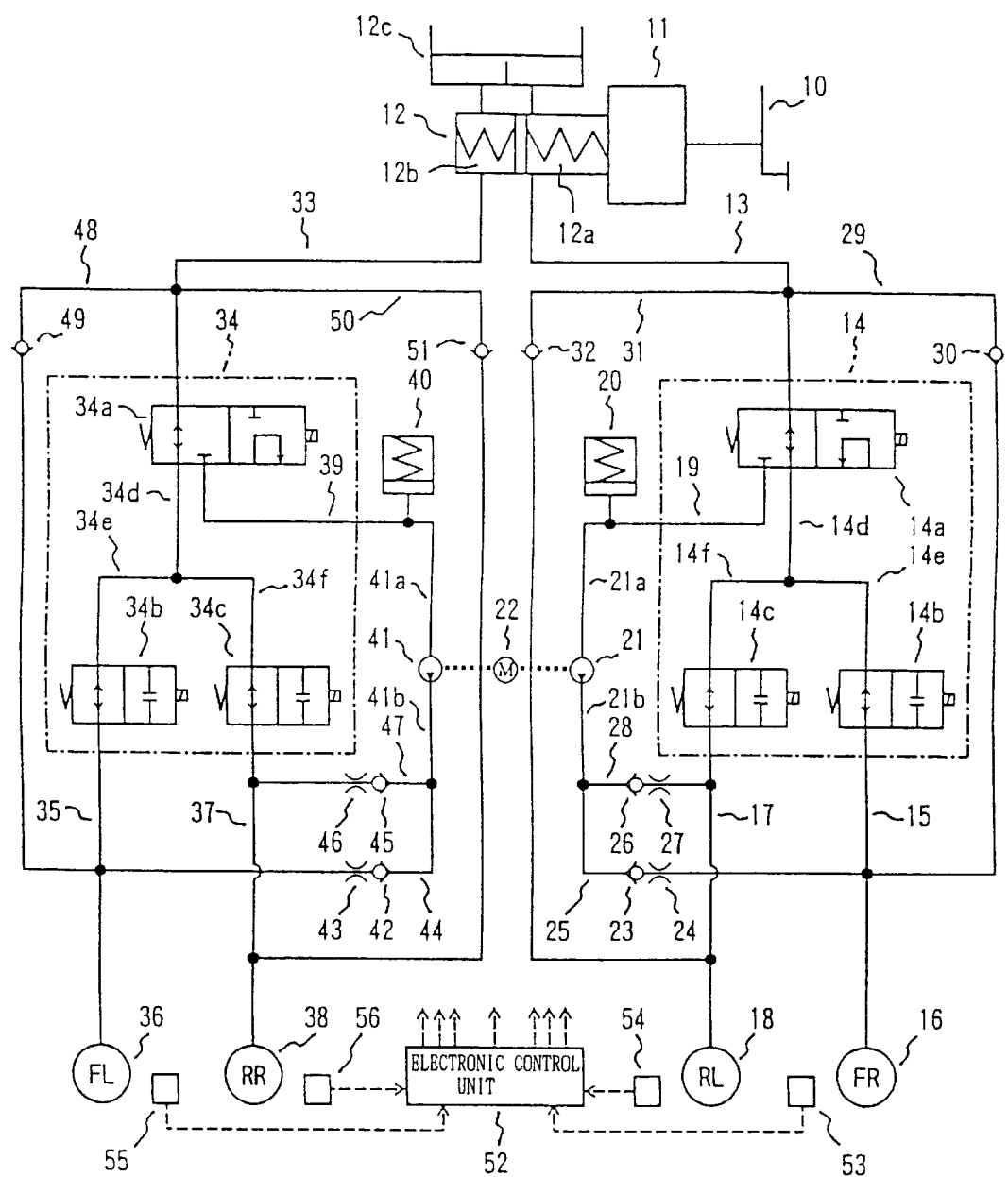
FIG. 2 is a diagram showing the overall construction of an embodiment of the antilock brake system according to the invention of this application.

FIG. 2 illustrates an overview of an antilock brake system for a FF vehicle (front-engine, front-drive vehicle), in which a left front-wheel brake for applying braking force to a left front wheel, which is a driving wheel, and a right rear-wheel brake for applying braking force to a right rear wheel, which is a driven wheel, are connected to a first pressure generating chamber of a tandem-type master cylinder, and a right front-wheel brake for applying braking force to a right front wheel, which is a driving wheel, and a left rear-wheel brake for applying braking force to a left rear wheel, which is a driven wheel, are connected to a second pressure generating chamber of a tandem-type master cylinder.

In FIG. 2, brake operating force applied to a brake pedal 10 is doubled by a negative-pressure type booster 11 and applied to a tandem-type master cylinder 12. The master cylinder 12 has a first pressure generating chamber 12a and a second pressure generating chamber 12b. A master cylinder reservoir 12c for replenishing the pressure generating chambers 12a and 12b with brake fluid is attached to the master cylinder 12.

The pressure generating chamber 12a of the master cylinder 12 is connected to a right front-wheel brake 16 via a passage 13, a control valve 14 and a passage 15, and to a left rear-wheel brake 18 via the passage 13, the control valve 14 and a passage 17.

The control valve 14 comprises a three-port, two-position electromagnetic changeover valve 14a, which is placed in a passage 14d connected to the passage 13 and to the passages 15, 17 via passages 14e, 14f, respectively, for selectively and simultaneously cutting off the right front-wheel brake 16 and the left rear-wheel brake 18 from the pressure generating chamber 12a and connecting them to a low back-pressure reservoir 20 via a passage 19, a two-port, two-position normally-open solenoid shut-off valve 14b placed in the passage 14e for selectively cutting off the right front-wheel brake 16 from the electromagnetic changeover valve 14a, and a two-port, two-position normally-open solenoid shut-off valve 14c placed in the passage 14f for selectively cutting off the left rear-wheel brake 18 from the electromagnetic changeover valve 14a.

The low back-pressure reservoir 20, which is well known, has a cylinder and a piston which define a fluid chamber connected to a passage 19, with the piston being biased by a spring so as to reduce the volume of the fluid chamber.

The low back-pressure reservoir 20 is connected to an intake passage 21a of a pump 21. The pump 21 is a piston-type pump having an intake valve and a discharge valve and is driven by a motor 22. The discharge passage 21b of the pump 21 is connected to the passage 15 by a passage 25 in which a check valve 23 and an orifice 24 are serially arranged, and to the passage 17 by a passage 28 in which a check valve 26 and an orifice 27 are serially arranged.

A check valve 30 which allows flow only from the passage 15 to the passage 13 is placed in a bypass passage 29 having one end connected to the passage 13 and the other end connected to the passage 15, and a check valve 32 which allows flow only from the passage 17 to the passage 13 is placed in a bypass passage 31 having one end connected to the passage 13 and the other end connected to the passage 17.

The pressure generating chamber 12b of the master cylinder 12 is connected to a left front-wheel brake 36 via a passage 33, a control valve 34 and a passage 35, and to a right rear-wheel brake 38 via the passage 33, the control valve 34 and a passage 37.

The control valve 34 comprises a three-port, two-position electromagnetic changeover valve 34a, which is placed in a passage 34d connected to the passage 33 and to the passages 35, 37 via passages 34e, 34f, respectively, for selectively and simultaneously cutting off the left front-wheel brake 36 and the right rear-wheel brake 38 from the pressure generating chamber 12b and connecting them to a low back-pressure reservoir 40 via a passage 39, a two-port, two-position normally-open solenoid shut-off valve 34b placed in the passage 34e for selectively cutting off the left front-wheel brake 36 from the electromagnetic changeover valve 34a, and a two-port, two-position normally-open solenoid shut-off valve 34c placed in the passage 34f for selectively cutting off the right rear-wheel brake 38 from the electromagnetic changeover valve 34a.

The low back-pressure reservoir 40, which is well known, has a cylinder and a piston which define a fluid chamber connected to a passage 39, with the piston being biased by a spring so as to reduce the volume of the fluid chamber.

The low back-pressure reservoir 40 is connected to an intake passage 41a of a pump 41. The pump 41 is a piston-type pump having an intake valve and a discharge valve and is driven by the motor 22. The discharge passage 41b of the pump 41 is connected to the passage 35 by a passage 44 in which a check valve 42 and an orifice 43 are serially arranged, and to the passage 37 by a passage 47 in which a check valve 45 and an orifice 46 are serially arranged.

A check valve 49 which allows flow only from the passage 35 to the passage 33 is placed in a bypass passage 48 having one end connected to the passage 33 and the other end connected to the passage 35, and a check valve 51 which allows flow only from the passage 37 to the passage 33 is placed in a bypass passage 50 having one end connected to the passage 33 and the other end connected to the passage 37.

In a case where antilock control is not being carried out, the electromagnetic changeover valves 14a and 34a and the electromagnetic cut-off valves 14b, 14c, 34b and 34c assume the states shown in FIG. 2 and the motor 22 is not operating. When the brake pedal 10 is depressed, therefore, the brake fluid pressure is supplied from the pressure generating chamber 12a of the master cylinder 12 to the right front-wheel brake 16 via the passage 13, control valve 14 and passage 15, and to the left rear-wheel brake 18 via the passage 13, control valve 14 and passage 17. At the same time, the brake fluid pressure is supplied from the pressure generating chamber 12b of the master cylinder 12 to the left front-wheel brake 36 via the passage 33, control valve 34 and passage 35, and to the right rear-wheel brake 38 via the passage 33, control valve 34 and passage 37. As a result, braking pressure is applied to the right front wheel, left rear wheel, left front wheel and right rear wheel to brake the vehicle.

If, say, the electromagnetic changeover valve 14a and electromagnetic cut-off valve 14c are actuated and the motor 22 is operated during braking of the vehicle, the brake fluid of the right front-wheel brake 16 flows out to the low back-pressure reservoir 20 via the electromagnetic cut-off valve 14b and electromagnetic changeover valve 14a so that the brake fluid pressure of the right front-wheel brake 16 decreases. Owing to the pump 21, the brake fluid that has flowed into the low back-pressure reservoir 20 flows into the right front-wheel brake 16 via the check valve 23 and orifice 24 and, at the same time, flows into the left rear-wheel brake 18 via the check valve 26 and orifice 27. Since the amount of brake fluid which flows into the right front-wheel brake 16 owing to the pump 21 is slightly less than the amount of brake fluid which flows out from the right front-wheel brake 16 to the low back-pressure reservoir 20, the brake fluid pressure of the right front-wheel brake 16 continues to decrease. The brake fluid pressure of the left rear-wheel brake 18 slowly increases in dependence upon the inflow of brake fluid due to the action of the pump 21.

If, in the state in which the electromagnetic changeover valve 14a and electromagnetic cut-off valve 14b are actuated and the motor 22 is operating, the electromagnetic cut-off valve 14c is deactuated, the brake fluid of the left rear-wheel brake 18 flows out to the low back-pressure reservoir 20 via the electromagnetic cut-off valve 14c and the electromagnetic changeover valve 14a so that the brake fluid pressure of the left rear-wheel brake 18 decreases. Further, the fluid pressure of the right front-wheel brake 16 slowly increases in dependence upon the inflow of brake fluid due to action of the pump 21.

When the brake fluid of the low back-pressure reservoir 20 vanishes, the slow increase in the pressure of the right front-wheel brake 16 and/or the left rear-wheel brake 18 stops.

The brake fluid pressure of the left front-wheel brake 36 and right rear-wheel brake 38 also can be decreased and slowly increased by the operation of the electromagnetic changeover valve 34a, electromagnetic cut-off valves 34b and 34c and motor 22.

The amount of discharge per stroke of the pumps 21 and 41 is set so as to obtain a slow pressure-increase gradient conforming to the coefficient of friction of a road surface for which the coefficient of friction is not low, such as the coefficient of friction of an iced road surface.

The electromagnetic changeover valve 14a and 34a, the electromagnetic cut-off valves 14b, 14c, 34b and 34c and the motor 22 are connected to an electronic control unit 52 and are electrically operated by the electronic control unit 52. Wheel velocity sensors 53, 54, 55 and 56 provided to correspond to the right front wheel, left rear wheel, left front wheel and right rear wheel are connected to the electronic control unit 52 and enter signals corresponding to the rotational velocities of the respective wheels into the electronic control unit 52.

Figure 3:
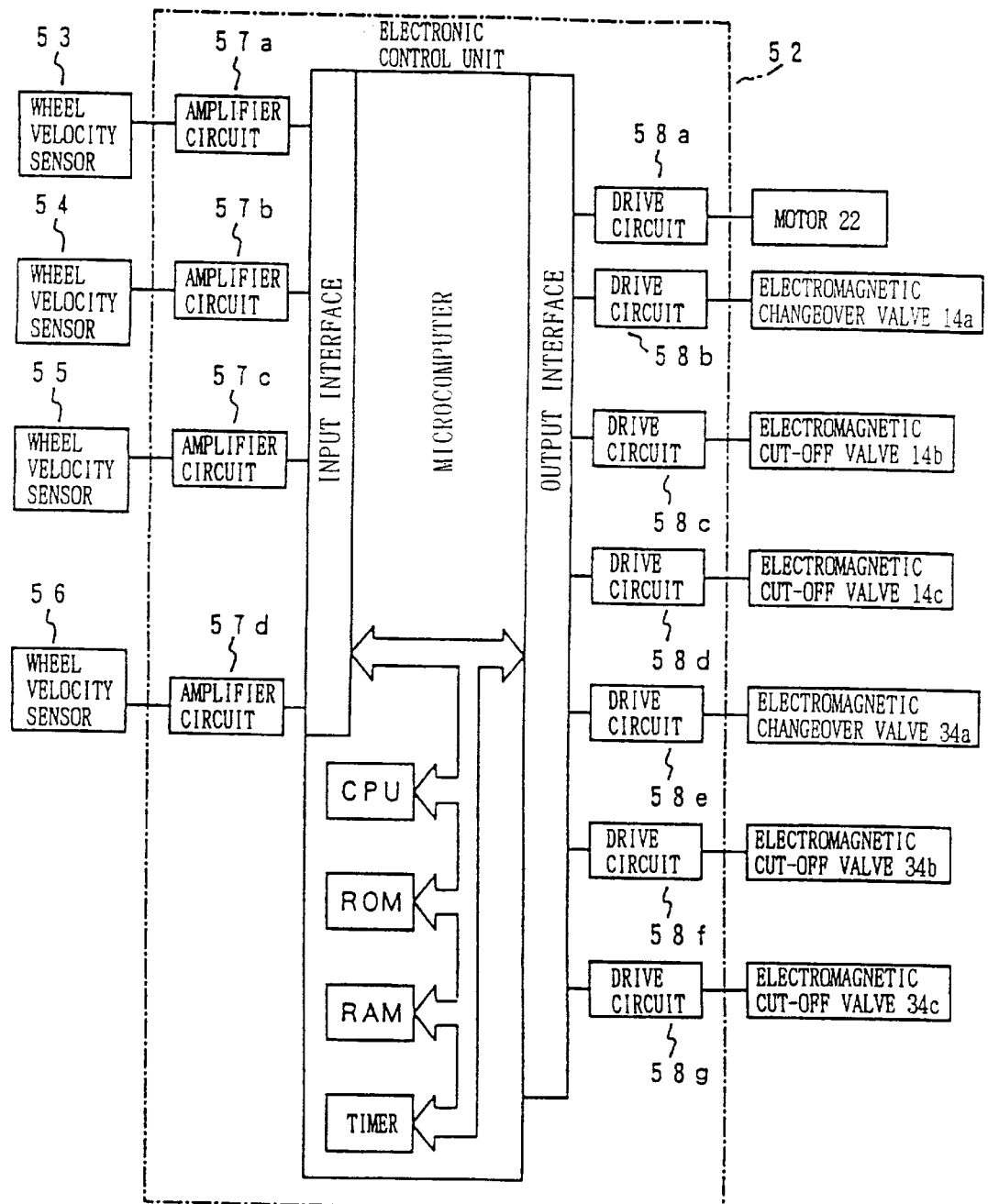
FIG. 3 is a block diagram showing the construction of an electronic control unit shown in FIG. 2.

As shown in FIG. 3, the electronic control unit 52 has a microcomputer comprising a CPU, a ROM, a RAM, a timer, an input interface and an output interface, which are interconnected by a bus. The output signals from the wheel velocity sensors 53–56 enter the CPU from the input interface via respective ones of amplifier circuits 57a–57d. Further, the output interface outputs a control signal to the motor 22 via a drive circuit 58a and outputs control signals to the electromagnetic changeover valves or electromagnetic cut-off valves 14a, 14b, 14c, 34a, 34b, 34c via drive circuits 58b–55g. In the microcomputer, the ROM stores a program conforming to the flowchart shown in FIG. 4, the CPU executes the program during the time that an ignition switch, not shown, is closed, and the RAM temporarily stores variable data necessary to execute the program.

Figure 4:
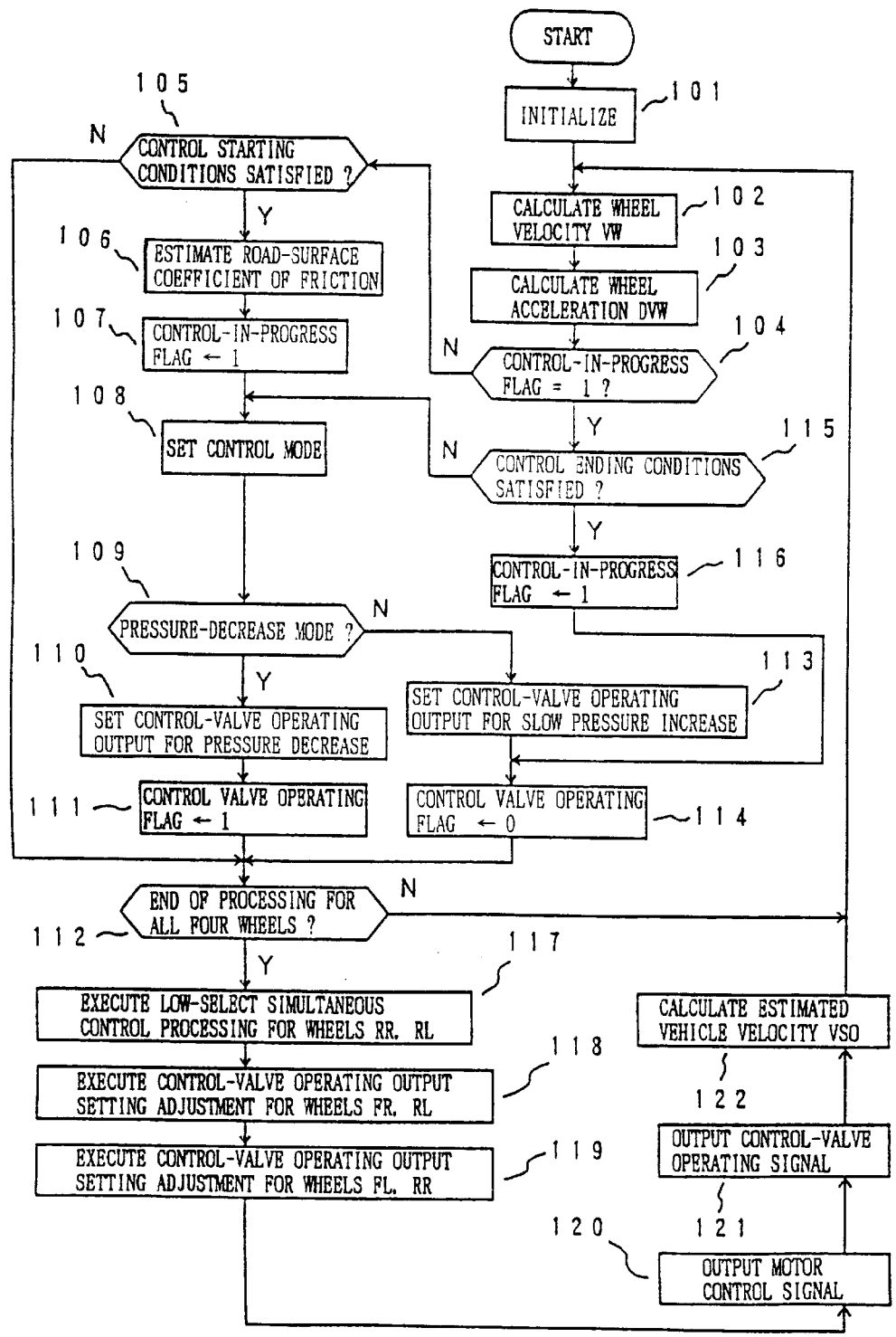
FIG. 4 is a flowchart showing the processing of antilock control in the above-mentioned embodiment.

In the embodiment constructed as set forth above, execution of the program conforming to the flowchart of FIG. 4 starts when the ignition switch (not shown) is closed. First, the microcomputer is initialized at step 101 in FIG. 4 so that an estimated vehicle velocity VSO representing vehicle velocity, wheel velocity VW of each wheel and wheel acceleration DVW, etc., are cleared. The vehicle velocity VW is then calculated from the output signal of the vehicle velocity sensor at step 102, and the program proceeds to step 103, at which wheel acceleration DVW is calculated from these values.

The program then proceeds to step 104, at which it is determined whether a control-in-progress flag is "1" (i.e., whether antilock control is in effect). If the control-in-progress flag is "1", the program proceeds to step 115; otherwise, it is determined at step 105 whether control starting conditions have been satisfied. If the control starting conditions have not been satisfied, then the program jumps to step 112. However, if it is judged that the control starting conditions have been satisfied, then the program proceeds to step 106, where the coefficient of friction of the road surface is estimated. The coefficient of friction of a traveled road surface is specified as being a low coefficient of friction or a coefficient of friction that is not low. The program proceeds to step 107, at which the control-in-program flag is set to "1".

Next, at step 108, a pressure-decrease or slow pressure-increase control mode is set in dependence upon the braking state, which is judged based upon the wheel velocity VW, wheel acceleration DVW and estimated vehicle velocity VSO, described later, and the coefficient of friction of the road surface. The program then proceeds to step 109, at which it is determined whether the control mode is the pressure-decrease mode. If the mode is the pressure-decrease mode, then the program proceeds to step 110, at which a control-valve operating output for pressure decrease is set, and then to step 111, at which a control-valve operating flag is set to "1", whereupon the program proceeds to step 112. If the determination made at step 109 is that the mode is not the pressure-decrease mode, it is judged that the mode is the slow pressure-increase mode and the program proceeds to step 113, where a control-valve operating output for slow pressure increase is set. Next, at step 114, the control-valve operating flag is set to "0", after which the program proceeds to step 112. If it is found at step 104 that the control-in-progress flag is "1", namely that antilock control is in effect, it is determined at step 115 whether conditions for ending control have been satisfied. If the conditions have not been satisfied, the program proceeds to step 108, at which the above-mentioned setting of the control mode is carried out. On the other hand, if it is determined at step 115 that the conditions for ending control have been satisfied, then the control-in-progress flag is set to "0" at step 116, after which the program proceeds to step 114.

The above-described setting of the control mode, the setting of the control valve operation for pressure decrease and the setting of the control valve operation for slow pressure increase is performed in a similar manner for each wheel, and the processing from step 102 onward is repeated until processing is completed for all four wheels. When the processing is completed, low-select simultaneous control processing for wheels RR, RL is executed at step 117, after which the program proceeds to step 118. Here processing for adjusting the setting of the control-valve operating output for wheels RR, RL is carried out. This is followed by step 119, at which processing for adjusting the setting of the control-valve operating output for wheels FR, RL is carried out. In the embodiment of FIG. 2, the connections are such that the two wheel brakes 16, 18 (36, 38) are communicated to the master cylinder 12 via one electromagnetic changeover valve 14a (34a), and such that the brake fluid is supplied from one pump 21 (41) to two wheel brakes 16, 18 (36, 38). Therefore, when one side is in the pressure-decrease mode, for example, it is possible for the other side to be placed in the slow pressure-increase mode but a state of rapid pressure increase cannot be established by connecting the master cylinder to the wheel brakes. Accordingly, if one side is in the pressure-decrease mode and the other side is not in the pressure-decrease mode or slow pressure-increase mode, the output setting on the other side is changed to the setting of the control-valve operating output for slow pressure increase at steps 118, 119, after which the program proceeds to step 120. It should be noted that the control-valve operating flag also is changed at steps 118, 119 attendant upon the change in the setting of the control-valve operating output.

At step 120, the motor control signal is outputted based upon the road-surface coefficient of friction estimated at step 106, the settings of the control-valve operating signals for each of the wheels FR, FL and the settings of the control-valve operating signals for each of the wheels RL, RR. When the processing of step 120 is finished, the program proceeds to step 121 to output the control-valve operating signal corresponding to the setting of the control-valve operating output for each of the wheels FR, FL and the setting of the control-valve operating output for each of the wheels RL, RR. More specifically, when the setting of the control-valve operating output for wheel FR is the control valve operation setting for pressure decrease, for example, the control-valve operating signal for pressure decrease is outputted, the solenoid coil of the electromagnetic changeover valve 14a is energized, the brake fluid of wheel brake 16 flows into the low back-pressure reservoir 20 through the electromagnetic changeover valve 14b, which is not in the energized state, and this is accompanied by a decrease in the brake fluid pressure of the wheel brake 16. Further, when the setting of the control-valve operating output for wheel FR is the control valve operation setting for slow pressure increase, the control-valve operating signal for slow pressure increase is outputted, the solenoid coils of the electromagnetic changeover valve 14a and electromagnetic cut-off valve 14b are energized and the brake fluid within the low back-pressure reservoir 20 is supplied to the wheel brake 16 through the check valve 23 and orifice 24 in succession owing to the action of the pump 21, thereby gradually increasing the pressure. At the time of ordinary braking, namely when these signals are not being outputted, the solenoid coils of the electromagnetic changeover valve 14a and electromagnetic cut-off valve 14b are de-energized so that the brake fluid pressure of the wheel brake 16 is increased by the output brake fluid pressure from the master cylinder. When this is completed, the estimated vehicle velocity VSO is calculated at step 122 and the program then returns to step 102. Control with regard to the wheels RL, FL, RR is performed in a manner similar to that described above.

Figure 5:
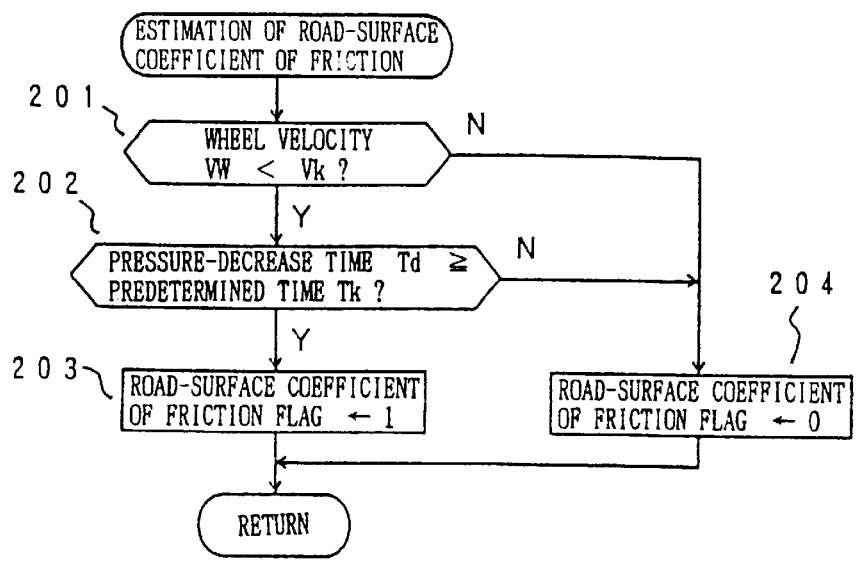
FIG. 5 is a flowchart showing the content of low-select simultaneous control processing with regard to wheels RR, RL in FIG. 4.

FIG. 5 illustrates the estimation, executed at step 106 in FIG. 4 described above, of the coefficient of friction of a traveled road. First, at step 201, it is determined whether the wheel velocity VW is less than a predetermined velocity Vk. When the vehicle velocity is less than the predetermined velocity, the program proceeds to step 202, at which it is determined whether a pressure-decrease time Td has continued in excess of a predetermined time Tk. When it is determined at steps 201 and 202 that the wheel velocity VW has fallen below the predetermined velocity Vk and that the pressure-decrease time TD has exceeded the predetermined time Tk, the program proceeds to step 203, at which a road-surface coefficient of friction flag is set to "1" (which means a low coefficient of friction). The program then returns to the main routine. When the wheel velocity VW is not below the predetermined velocity Vk, and when the pressure-decrease time Td is less than the predetermined time Tk, the program proceeds to step 204, where the coefficient of friction flag is set to "0" (which means that the coefficient of friction is not a low coefficient of friction). The program then returns to the main routine.

Figure 6:
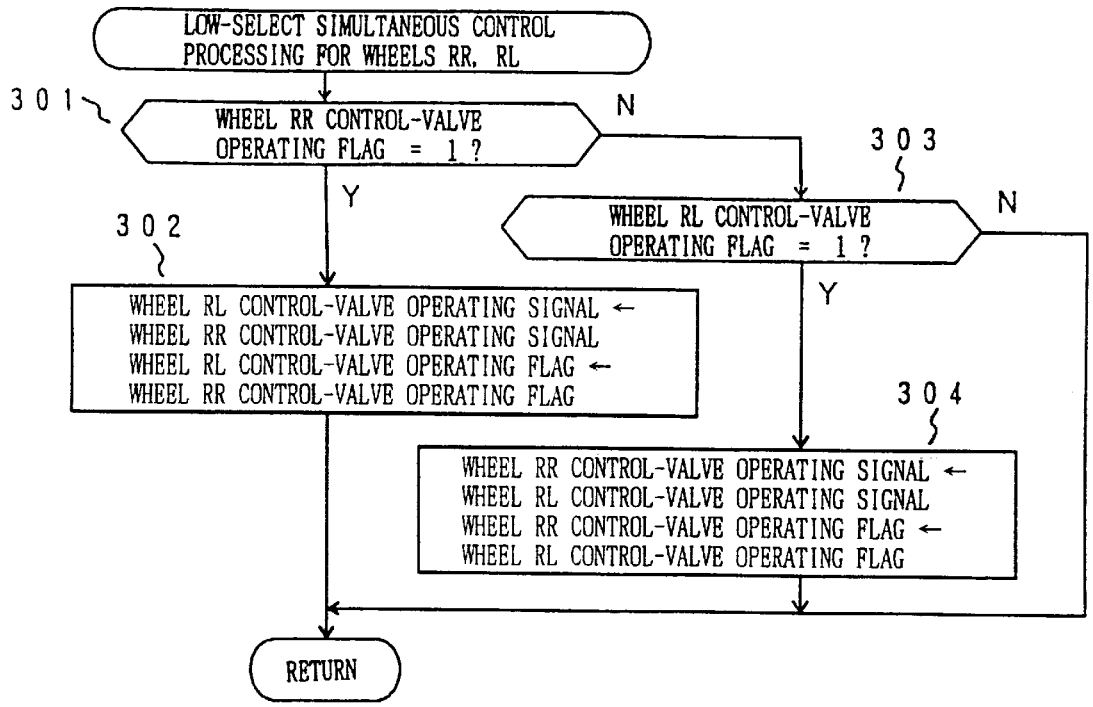
FIG. 6 is a flowchart showing the contents of processing for estimating the coefficient of friction of a travel road surface in FIG. 4.

FIG. 6 shows the contents of low-select simultaneous control processing for the wheels RR, RL executed at step 117 in FIG. 4 described above. First, at step 301, it is determined whether the control-valve operating flag of one wheel, e.g., wheel RR, is "1". If the flag is "1", the program proceeds to step 302, at which the setting of the control-valve operating output for wheel RL and the control-valve operating flag for wheel RL are made the same as the setting of the control-valve operating output for wheel RR and the control-valve operating flag for wheel RR, after which the program returns to the main routine of FIG. 4. When it is determined at step 301 that the control-valve operating flag of wheel RR is not "1", the program proceeds to step 303, at which it is determined whether the control-valve operating flag of wheel RL is "1". If it is "1", then the program proceeds to step 304, at which the setting of the control-valve operating output for wheel RR and the control-valve operating flag for wheel RR are made the same as the setting of the control-valve operating output for wheel RL and the control-valve operating flag for wheel RL, after which the program returns to the main routine of FIG. 4.

Figure 7:
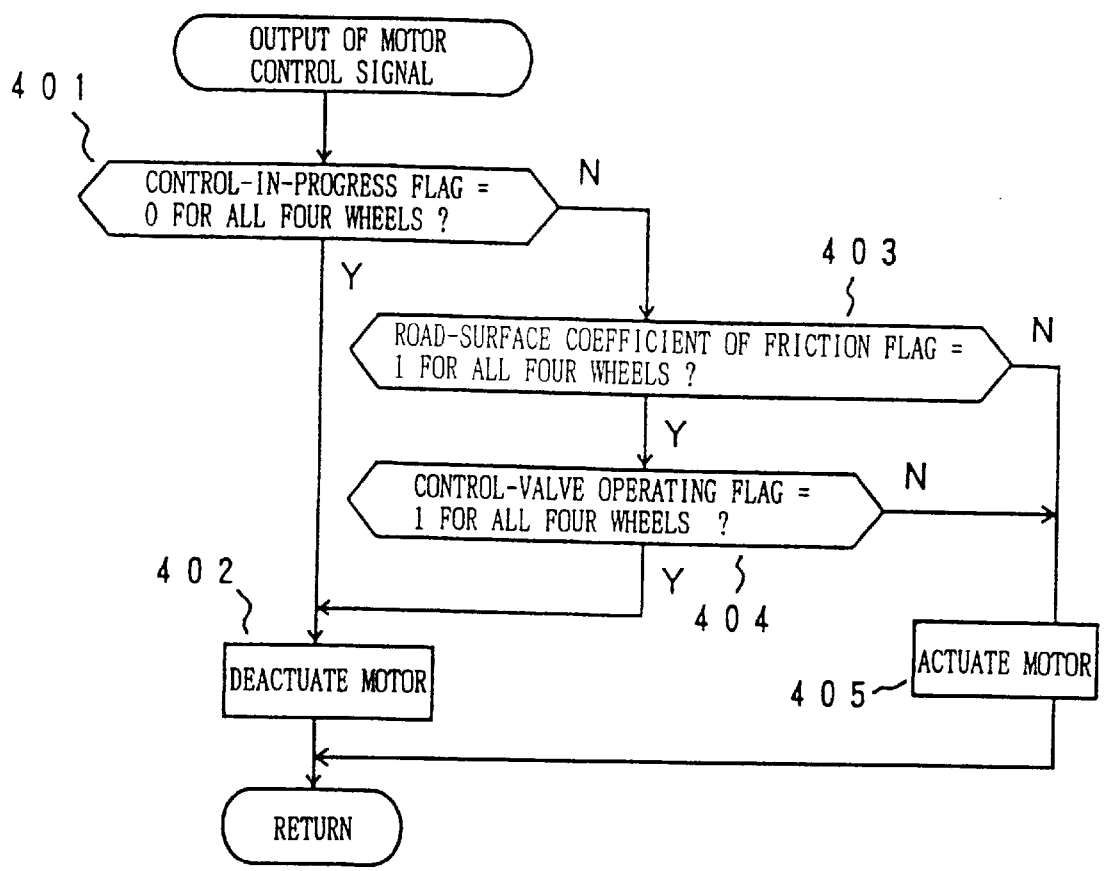
FIG. 7 is a flowchart showing an example of the contents of processing for outputting a motor control signal in FIG. 4.

FIG. 7 shows the contents of processing, executed at step 120 in FIG. 4 described above, for outputting the motor control signal. First, at step 401, it is determined whether the control-in-progress flag is "0" for all four wheels. If the flag is "0", the program proceeds to step 402, at which processing for deactuating the motor (de-energization accompanied by a prescribed lag time) is executed. The program then returns to the main routine of FIG. 4. In a case where it is determined at step 401 that the control-in-progress flag for all four wheels is not "0", it is determined at step 403 whether the road-surface coefficient of friction flag is "1" for all four wheels. If the flag is "1", then the program proceeds to step 404, at which it is determined whether the control-valve operating flag is "1" for all four wheels. If the flag is "1", then the program proceeds to step 402. Further, when the road-surface coefficient of friction is not "1" for all four wheels (and when the control-valve operating flag is not "0" for all four wheels) in a case here the control-in-progress flag is not "1" for all four wheels, processing for actuating the motor (for energizing the motor) is executed at step 405, after which the program returns to the main routine of FIG. 4.

When, during antilock control, the electromagnetic changeover valves or electromagnetic cut-off valves 14*a*, 14*b*, 14*c*, 34*a*, 34*b*, 34*c* are operated in a state in which the brake fluid pressure of each of the wheel brakes 16, 36 is decreased and the brake fluid pressure of the wheel brakes 18, 38 is decreased, and it is has been estimated that the road-surface coefficients of friction on both the left and right sides of the vehicle are low coefficients of friction, the operation of the motor 22 is stopped and the pumps 21, 41 stop discharging brake fluid. As a result, the brake fluid pressure of the wheel brakes 16, 18, 36, 38 is reduced to the fluid pressure of the low back-pressure reservoirs 20, 40 so that locking of the wheels FR, FL, RR, RL is avoided. Further, when, during antilock control, the valves are operated in a state in which even one of the brake fluid pressure of each of the wheel brakes 16, 36 and brake fluid pressure of the wheel brakes 18 and 38 slowly increases, or the road-surface coefficient of friction on either of the left and right sides of the vehicle is the low coefficient of friction and the road-surface coefficient of friction on the other side is not the low coefficient of friction, the motor 22 is actuated so that the pumps 21, 41 discharge brake fluid. As a result, the brake fluid pressure of the wheel brakes 16, 18, 36, 38 is slowly increased so that the braking force can be raised.

Figure 8:
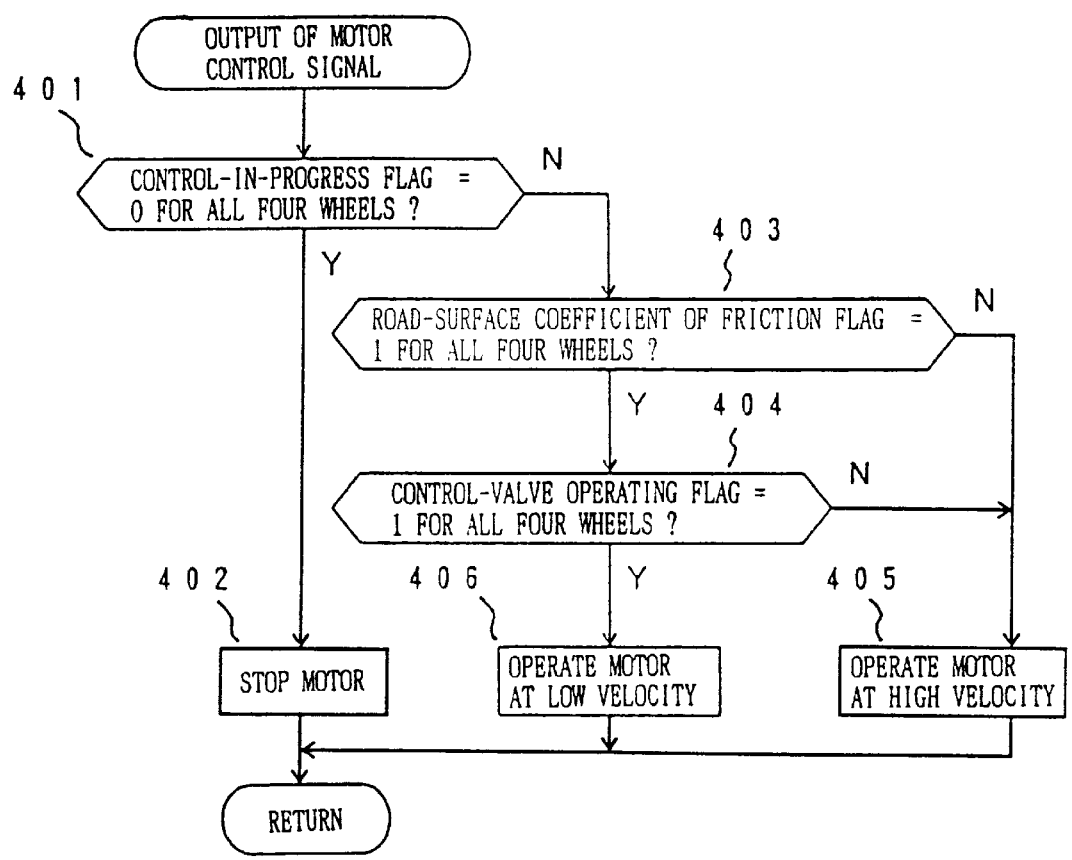
FIG. 8 is a flowchart showing another example of the contents of processing for outputting a motor control signal in FIG. 4.

The contents of the processing for outputting the motor control signal of FIG. 7 can be implemented by the processing of FIG. 8 instead. In the case where the processing shown in FIG. 8 is executed, an arrangement is adopted in which the drive circuit 58*a* of FIG. 3 controls the duty of the motor 22 in response to a duty signal which enters from the microcomputer (e.g., by opening and closing the feeder line of the motor by a FET which operates in response to the input duty signal). In FIG. 8, it is determined at step 401 whether the control-in-progress flag is "0" for all four wheels. If the flag is "0", the program proceeds to step 402, at which processing for deactivating the motor (energization at duty zero, namely de-energization, accompanied by a prescribed lag time) is executed. The program then returns to the main routine of FIG. 4. In a case where it is determined at step 401 that the control-in-progress flag for all four wheels is not "0", it is determined at step 403 whether the road-surface coefficient of friction flag is "1" for all four wheels. If the flag is "1", then the program proceeds to step 404, at which it is determined whether the control-valve operating flag is "1" for all four wheels. If the flag is "1", then the program proceeds to step 406, at which processing for operating the motor at low velocity (duty energization at a prescribed duty less than a duty of 100%, e.g., energization at a duty of 20%) is executed. The program then returns to the main routine of FIG. 4. High-speed operation of the motor corresponds to operation of the motor in the manner shown in FIG. 7.

When, during antilock control, the electromagnetic changeover valves or electromagnetic cut-off valves 14*a*, 14*b*, 14*c*, 34*a*, 34*b*, 34*c* are operated in a state in which the brake fluid pressure of each of the wheel brakes 16, 36 is decreased and the brake fluid pressure of the wheel brakes 18, 38 is decreased, and it is has been estimated that the road-surface coefficients of friction on both the left and right sides of the vehicle are low coefficients of friction, the motor 22 is operated at low velocity (low rpm) so that the amount of brake fluid discharged by the pumps 21, 41 decreases. As a result, the brake fluid pressure of the wheel brakes 16, 18, 36, 38 is reduced to the fluid pressure of the low back-pressure reservoirs 20, 40 so that locking of the wheels FR, FL, RR, RL is avoided. Further, when, during antilock control, the valves are operated in a state in which even one of the brake fluid pressure of each of the wheel brakes 16, 36 and brake fluid pressure of the wheel brakes 18 and 38 slowly increases, or the road-surface coefficient of friction on either of the left and right sides of the vehicle is the low coefficient of friction and the road-surface coefficient of friction on the other side is not the low coefficient of friction, the motor 22 is operated at high velocity (high rpm) and the pumps 21, 41 discharge brake fluid. As a result, the brake fluid pressure of the wheel brakes 16, 18, 36, 38 is slowly increased so that the braking force can be raised.

In the embodiment described, an arrangement may be adopted in which the ranges of coefficients of friction of the traveled road surface estimated are made three or more, the operating velocity (rpm) of the motor is varied in conformity with the coefficient of friction and the slow pressure-increase gradient of the brake fluid pressure is adjusted. Furthermore, the pumps 21, 41 may be driven by separate motors.

Industrial Applicability

The antilock brake system according to the invention of this application has road-surface coefficient estimating means for estimating a coefficient of friction on a road surface on which a wheel, which is braked by a wheel brake, is traveling, and motor operating means for operating the motor based upon at least results of estimation from the road-surface coefficient estimating means and a control-valve operating signal outputted by the control valve operating means. As a result, the motor can be rotated and stopped (or have its rpm reduced) in dependence upon the estimated value of the coefficient of friction of the traveled road surface and the operating state of the control valve. This makes it possible to obtain an appropriate slow pressure-increase gradient for a road surface having a high coefficient of friction, and to sufficiently reduce brake fluid pressure for a road surface having a low coefficient of friction, such as the coefficient of friction of an iced road surface, i.e., to avoid locking of wheels by reducing the brake fluid pressure to the fluid pressure of the low back-pressure reservoir. Since the motor can be actuated from the first reduction in pressure, a lag in the slow pressure increase at the time of the first slow pressure increase is reduced.

What is claimed is:

1. An antilock brake system having at least one wheel brake, a master cylinder for supplying brake fluid pressure to said at least one wheel brake, a control valve operable in a normal condition in which said at least one wheel brake is communicated with said master cylinder and cut off from a low back-pressure reservoir, a pressure-reducing condition in which said at least one wheel brake is cut off from said master cylinder and communicated with the low back-pressure reservoir, and a slow pressure-increasing condition in which said at least one wheel brake is cut off from said master cylinder and cut off also from said low back-pressure reservoir, a pump for pumping the brake fluid within said low back-pressure reservoir to said wheel brake without passing through said control valve, and a motor for driving the pump, said system comprising:

wheel velocity detecting means for detecting a rotational velocity of a wheel braked by said at least one wheel brake, control valve operating means for operating said control valve in any one of the normal condition, the pressure-reducing condition and the slow pressure-increasing condition based upon an output from the wheel velocity detecting means, road-surface coefficient of friction estimating means for estimating a coefficient of friction of the road surface on which said wheel is traveling, and motor operating means receiving a signal from said road surface coefficient of friction estimating means to determine a velocity of the motor and for operating the motor based upon at least the signal received from said road-surface coefficient of friction estimating means and a control-valve operating output from said control valve operating means.

2. An antilock brake system according to claim 1, wherein when the control-valve operating output of said control valve operating means is the pressure-reducing condition, said motor operating means makes the operating velocity of said motor, which prevails when results of the estimation from said road-surface coefficient of friction estimating means are indicative of a low coefficient of friction, less than the operating velocity of said motor prevailing when results of the estimation from said road-surface coefficient of friction estimating means are indicative of a high coefficient of friction.

3. An antilock brake system comprising;

at least one wheel brake;

a master cylinder for supplying brake fluid pressure to said at least one wheel brake;

a control valve operable in a normal condition in which said at least one wheel brake is communicated with said master cylinder and cut off from a low back-pressure reservoir, a pressure-reducing condition in which said at least one wheel brake is cut off from said master cylinder and is communicated with said low back-pressure reservoir, and a slow pressure-increasing condition in which said at least one wheel brake is cut off from said master cylinder and from said low back-pressure reservoir;

a pump for pumping brake fluid within said low back-pressure reservoir to said at least one wheel brake without the brake fluid passing through said control valve;

a motor for driving said pump;

wheel velocity detecting means for detecting a rotational velocity of a wheel to be braked by said at least one wheel brake;

control valve operating means for operating said control valve in any one of said normal condition, said pressure-reducing condition and said slow pressure-increasing condition based upon a signal from said wheel velocity detecting means, motor operating means for controlling an operational state of the motor, and road surface estimating means for estimating a coefficient of friction of the road surface on which said wheel to be braked is traveling, wherein when estimation results from the road-surface estimating means are indicative of a low coefficient of friction of the road-surface on which the wheel to be braked is traveling the operating velocity of the motor in dependence on at least the estimation results from the road-surface estimating means is less than the operating velocity of the motor when the estimation results from the road-surface estimating means are indicative of a high coefficient of friction of the road-surface.

* * * * *